(12) United States Patent
Itoh et al.

(10) Patent No.: US 8,417,742 B2
(45) Date of Patent: Apr. 9, 2013

(54) INFORMATION PROCESSING APPARATUS AND INFORMATION PROCESSING METHOD

(75) Inventors: Fumiaki Itoh, Yokohama (JP); Tsutomu Inose, Kawasaki (JP); Hiroyuki Nagai, Yokohama (JP); Tomoyuki Shimizu, Kawasaki (JP); Hajime Futatsugi, Tokyo (JP); Hidenori Ishiwata, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 205 days.

(21) Appl. No.: 12/700,657

(22) Filed: Feb. 4, 2010

(65) Prior Publication Data

US 2010/0146017 A1 Jun. 10, 2010

Related U.S. Application Data

(62) Division of application No. 11/785,772, filed on Apr. 20, 2007, now abandoned.

(30) Foreign Application Priority Data

Apr. 27, 2006 (JP) ................................ 2006-124331

(51) Int. Cl.
*G06F 17/30* (2006.01)
(52) U.S. Cl. .......................... 707/812; 707/813
(58) Field of Classification Search .................. 707/812
See application file for complete search history.

(56) References Cited

U.S. PATENT DOCUMENTS

| | | | |
|---|---|---|---|
| 5,493,678 A * | 2/1996 | Arcuri et al. ........................ | 1/1 |
| 5,659,736 A | 8/1997 | Hasegawa et al. | |
| 5,778,384 A * | 7/1998 | Provino et al. ..................... | 1/1 |
| 5,915,254 A * | 6/1999 | Nakayama et al. ................. | 1/1 |
| 6,330,572 B1 | 12/2001 | Sitka | |
| 6,434,568 B1 | 8/2002 | Bowman-Amuah | |
| 6,823,350 B1 | 11/2004 | Mansour et al. | |
| 7,024,427 B2 * | 4/2006 | Bobbitt et al. ...................... | 1/1 |
| 7,124,139 B2 * | 10/2006 | Nemoto et al. ..................... | 1/1 |
| 7,130,467 B1 * | 10/2006 | Bronder et al. .............. | 382/218 |
| 7,359,991 B2 | 4/2008 | Balducci et al. | |
| 7,536,390 B2 * | 5/2009 | Ebbo et al. ......................... | 1/1 |
| 7,587,426 B2 * | 9/2009 | Fujiwara et al. .................... | 1/1 |
| 7,730,114 B2 * | 6/2010 | Bybee et al. ................. | 707/825 |
| 2002/0194177 A1 * | 12/2002 | Sherman et al. ................. | 707/8 |
| 2003/0115218 A1 * | 6/2003 | Bobbitt et al. ................. | 707/200 |
| 2003/0140051 A1 * | 7/2003 | Fujiwara et al. .............. | 707/100 |
| 2004/0003286 A1 * | 1/2004 | Kaler et al. .................... | 713/201 |
| 2004/0119743 A1 * | 6/2004 | Xu ................................ | 345/760 |
| 2004/0133573 A1 | 7/2004 | Miloushev et al. | |
| 2004/0193969 A1 * | 9/2004 | Nemoto et al. ............... | 714/100 |
| 2005/0013208 A1 * | 1/2005 | Hirabayashi et al. ...... | 369/27.01 |
| 2005/0044113 A1 * | 2/2005 | Manikutty et al. ......... | 707/104.1 |
| 2005/0071349 A1 | 3/2005 | Jordan et al. | |
| 2005/0091226 A1 * | 4/2005 | Lin et al. ...................... | 707/100 |
| 2005/0187889 A1 * | 8/2005 | Yasoshima ....................... | 707/1 |

(Continued)

FOREIGN PATENT DOCUMENTS

JP 63124147 A 5/1988
JP 2001051890 A 2/2001

*Primary Examiner* — Binh V Ho
(74) *Attorney, Agent, or Firm* — Fitzpatrick, Cella, Harper & Scinto

(57) ABSTRACT

A folder relationship holding unit (305) manages the relationship only between parents and children of files and/or folders arranged in a hierarchical structure. An operation target of the files and/or folders managed by the folder relationship holding unit (305) is operated in a locked state. To reflect the operation result on each apparatus that manages information identical to that managed by the folder relationship holding unit (305), the apparatus is notified of the operation result at a designated timing.

3 Claims, 19 Drawing Sheets

U.S. PATENT DOCUMENTS

2006/0064434 A1    3/2006  Gilbert et al.
2006/0195465 A1*   8/2006  Atchison et al. .............. 707/102
2006/0253501 A1*  11/2006  Langan et al. ................ 707/201
2006/0282483 A1*  12/2006  Hachio et al. ................. 707/204
2007/0079100 A1*   4/2007  Shiga et al. ................... 711/170

* cited by examiner

FIG. 6

| 601 | 602 |
|---|---|
| 00100203 | 001 |
| 00100238 | 001 |
| ⋮ | ⋮ |
| 00200745 | 002 |

FIG. 7

| 701 | 702 | 703 | 704 |
|---|---|---|---|
| 00100185 | F | □□□ | 2005.1.12 13:10 |
| 00100203 | C | ○○○ | 2005.1.12 15:24 |
| 00100238 | C | ○○◇◇ | 2005.2.15 16:32 |
| ⋮ | ⋮ | ⋮ | ⋮ |
| 00200739 | F | △△○○ | 2005.5.22 10:10 |
| 00200745 | C | △△△ | 2005.5.22 10:14 |

FIG. 8

| 801 | 802 |
|---|---|
| 00100185 | 00100203 |
| 00100185 | 00100238 |
| ⋮ | ⋮ |
| 00100331 | 00200745 |
| 00100185 | 00200739 |

FIG. 18

| 1801 | 1802 |
|---|---|
| 00100203 | 001 |
| 00100238 | |
| ⋮ | ⋮ |
| 00200745 | 002 |

INFORMATION PROCESSING APPARATUS AND INFORMATION PROCESSING METHOD

This application is a divisional of U.S. patent application Ser. No. 11/785,772, filed Apr. 20, 2007, the contents of which are incorporated by reference herein.

BACKGROUND OF THE INVENTION

1. Field of the Invention

The present invention relates to a file and/or folder management technique.

2. Description of the Related Art

Distributed data management systems are recently implemented, in which a plurality of apparatuses connected via a network manage data virtually by a single system in cooperation with each other.

For example, independently of the local file system of each apparatus, a virtual distributed file system is provided as an integrated system for the apparatuses (Japanese Patent Laid-Open No. 2001-051890). A system of this type has correlation data between a path to actually save data on a local file system and a path on the virtual distributed file system. A client accesses data by using the path on the virtual distributed file system. This provides a virtual distributed file system that conceals local file systems and unifies a plurality of apparatuses.

The virtual single system has the same tree structure of folders as in the local file system. The system has a root folder on top. Subfolders and contents are saved under the root folder. Each subfolder also has its subfolders and contents. The folder groups form a tree structure. The contents are saved in one folder. A folder that saves subfolders and contents is called a parent folder.

The virtual distributed file system is operable by a plurality of apparatuses. The plurality of apparatuses may parallelly execute conflicting operations. To cause other apparatuses to share an execution result after a conflicting operation, the conflict needs to be solved, though this is a complex process. In many cases, parallel execution of conflicting operations is prevented by locking folders and contents. For example, to delete a folder and its subordinate data, the apparatus that executes this operation locks the folder and all the subordinate folders and contents. The folders and contents are deleted after they are locked. The remaining apparatuses cannot change the locked folders and contents. Hence, any conflicting operation can be prevented.

In the conventional distributed data management system, however, the folders and contents must be saved somewhere on the tree structure. If an operation would change the tree structure, the number of folders to be locked increases. Since the number of unchangeable folders that are already locked by other apparatuses increases, operations that are executable in parallel are limited. Especially when an apparatus is disconnected from the network and used offline, the lock period is long, and the problem becomes more conspicuous.

For example, if there is a possibility that an apparatus may delete a specific folder, the specific folder and its subordinate folders and contents are locked. In this case, another offline apparatus disconnected from the apparatus cannot change any arbitrary folder or content under the folder.

SUMMARY OF THE INVENTION

The present invention has been made in consideration of the above-described problem, and has as its object to provide a technique of causing a plurality of apparatuses to manage data in a single system and reducing the number of files and folders that require lock for conflict avoidance.

According to the present invention, the foregoing object is attained by providing an information processing apparatus comprising:

management unit adapted to manage metadata of each file or folder in the information processing apparatus as data sharable by a plurality of information processing apparatuses that form a network;

registration unit adapted to register, as a parent-child hierarchy, a relationship between a first folder and a second folder in the information processing apparatus; and reflection unit adapted to reflect an operation result of the file or folder operated offline on the plurality of information processing apparatuses at a designated timing, wherein in reflecting the operation result, if the first folder as a parent layer associated with the second folder by the registration unit is deleted offline, registration is done not to make the second folder have a parent folder.

According to another aspect of the present invention, the foregoing object is attained by providing An information processing method executed by an information processing apparatus, comprising steps of:

managing metadata of each file or folder in the information processing apparatus as data sharable by a plurality of information processing apparatuses that form a network;

registering, as a parent-child hierarchy, a relationship between a first folder and a second folder in the information processing apparatus; and reflecting an operation result of the file or folder operated offline on the plurality of information processing apparatuses at a designated timing, wherein in reflecting the operation result, if the first folder as a parent layer associated with the second folder in the registering step is deleted offline, registration is done not to make the second folder have a parent folder.

Further features of the present invention will become apparent from the following description of exemplary embodiments with reference to the attached drawings.

BRIEF DESCRIPTION OF THE DRAWINGS

FIG. 6 is a view showing a configuration example of table information held by a main body arrangement data holding unit 303;

FIG. 7 is a view showing a configuration example of metadata held by a metadata holding unit 304;

FIG. 8 is a view showing a configuration example of folder relationship data;

FIG. 18 is a view showing a configuration example of lock management data held by a lock management unit.

DESCRIPTION OF THE EMBODIMENTS

Preferred embodiments of the present invention will now be described in detail in accordance with the accompanying drawings.

First Embodiment

Figure 1:
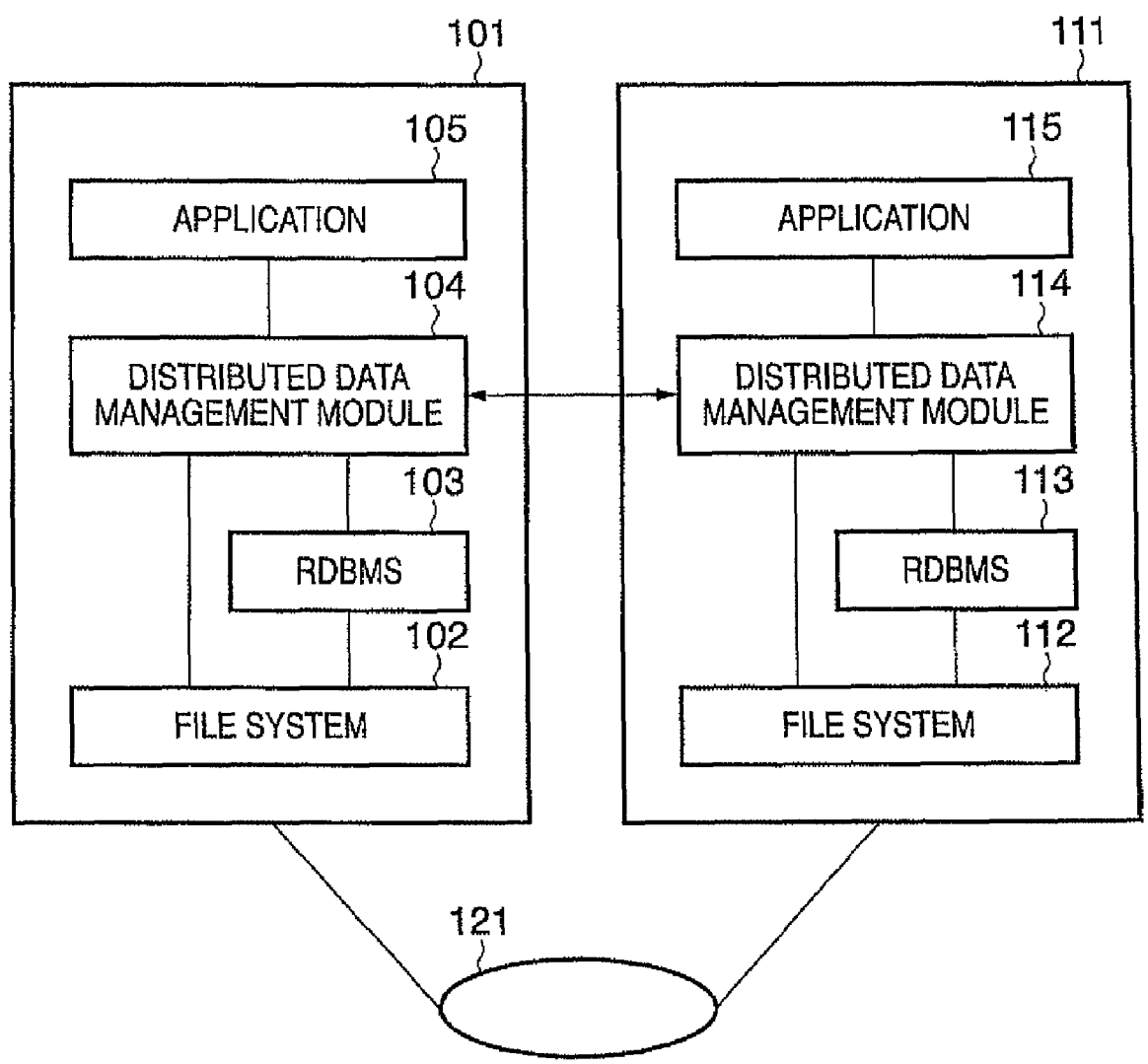
FIG. 1 is a block diagram showing the basic arrangement of a system (distributed data management system) according to the first embodiment of the present invention.

FIG. 1 is a block diagram showing the basic arrangement of a system (distributed data management system) according to the first embodiment.

Referring to FIG. 1, reference numerals 101 and 111 denote computers included in the system. As shown in FIG. 1, the computers have the same functional arrangement and can execute data communication with each other via a network 121.

The functional arrangement of the computer 101 will be described below. Applications 105 and 115, distributed data management modules 104 and 114, RDBMSs (Relational Database Management Systems) 103 and 113, and file systems 102 and 112 have the same functions. The following explanation also applies to the computer 111.

The file system 102 manages creation, change, acquisition, and deletion of files by using paths. Such a file system is generally used in a computer apparatus and can employ any file management form. For example, FAT, NTFS (Windows®), and UFS (Unix®) are usable.

The RDBMS 103 manages registration, change, acquisition, and deletion of data with a table format in accordance with a relational model. The RDBMS can employ any form. The RDBMS is also generally used in a computer apparatus, and a description thereof will be omitted.

The distributed data management module 104 is the major part of this embodiment, and its detailed operation will be described later.

The application 105 can be of any type if it can manage data by using the distributed data management module 104. The application 105 which is going to register or acquire data uses a distributed data management module (distributed data management module 104 in this case) running in a computer (computer 101 in this case) that is executing the application 105.

The file system 102, RDBMS 103, distributed data management module 104, and application 105 are implemented by software. They may be formed partially using hardware.

The following description does not exclude use of different software configurations if they have the same function. Especially, the application often changes between computers.

In the following description, the distributed data management modules 104 and 114 cooperate with each other via communication, thereby forming a distributed data management system.

In the following description, the two computers 101 and 111 (i.e., the two distributed data management modules 104 and 114) form the distributed data management system. The distributed data management system may be formed by connecting three or more computers via the network 121. Even in this case, the computer operation to be described below is applied to individual computers.

Figure 2:
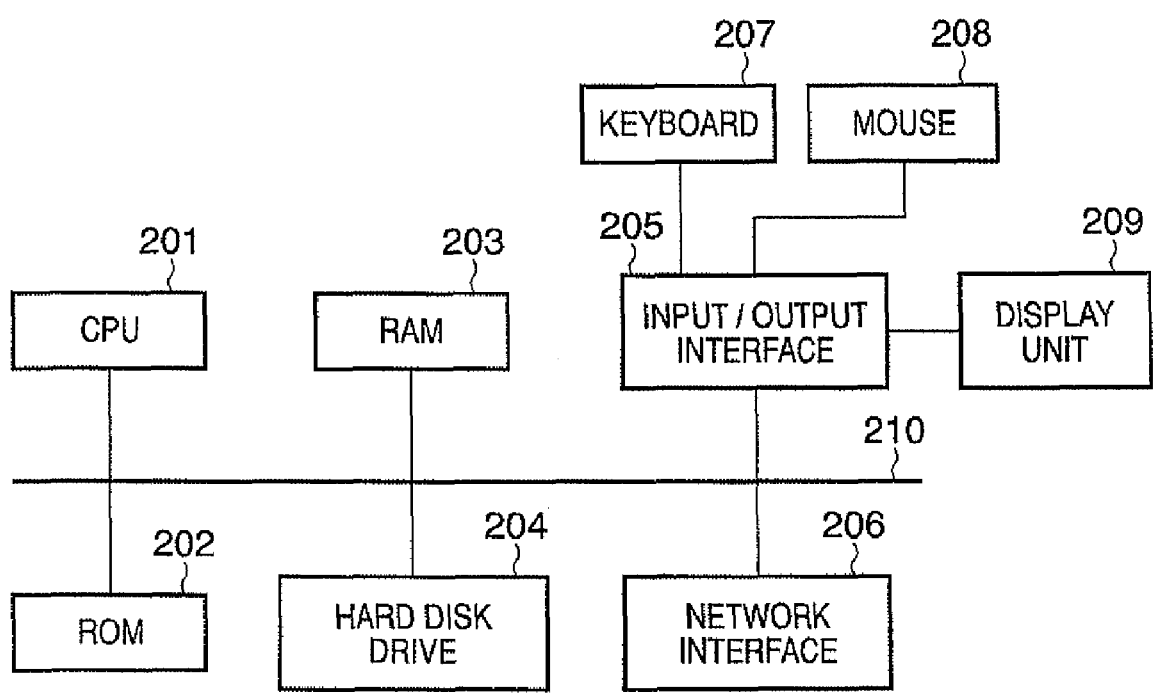
FIG. 2 is a block diagram showing the hardware configuration of a computer applicable to computers 101 and 111 (i.e., applicable to computers included in the distributed data management system)

FIG. 2 is a block diagram showing the hardware configuration of a computer applicable to the computers 101 and 111 (i.e., applicable to computers included in the distributed data management system).

A CPU 201 controls the entire computer by using programs and data stored in a RAM 203 or a ROM 202 and executes processes (to be described later) of the apparatus (computer 101 or 111) using the computer.

The ROM 202 stores setting data and programs of the computer.

The RAM 203 has an area to temporarily store programs and data loaded from a hard disk drive 204 or programs and data received from an external device via a network interface 206. The RAM 203 also has a work area to be used by the CPU 201 to execute each process. That is the RAM 203 can provide various kinds of areas as needed.

The hard disk drive 204 stores the OS (Operating System), and programs and data to make the CPU 201 execute each process (to be described later) of the apparatus using the computer (computer 101 or 111). More specifically, when this computer is applied to the computer 101, the hard disk drive 204 stores software programs corresponding to the file system 102, application 105, distributed data management module 104, and RDBMS 103 and various kinds of data (to be described later) managed by the distributed data management module 104, file system 102, and RDBMS 103.

An input/output interface 205 functions as an interface to connect a keyboard 207, mouse 208, and display unit 209 to a bus 210 and control them. The operator of the computer can input various kinds of instructions to the CPU 201 by operating the keyboard 207 and mouse 208. Any other device may be used if it can achieve the same object.

The display unit 209 including a CRT or a liquid crystal display panel can display the process result of the CPU 201 by an image or a text.

The network interface 206 functions as an interface to connect the computer to the network 121 and execute data communication with an external device via the network 121. For example, when the computer is applied to the computer 101, the network interface 206 is used for data communication with the computer 111 via the network 121.

The bus 210 connects the above-described units.

In the following description, the modules (applications 105 and 115, distributed data management modules 104 and 114, RDBMSs 103 and 113, and file systems 102 and 112) shown in FIG. 1 will be described below as operation entities. Actually, the CPU 201 executes a program corresponding to each module to execute a process to be described as the process of the module. A module that operates as a "holding unit" corresponds to the RAM 203 or hard disk drive 204.

In the process to be described below, data is temporarily stored in the RAM 203 or saved in the hard disk drive 204, unless it is specifically stated otherwise. In addition, data is read out from the hard disk drive 204, unless it is specifically stated otherwise.

Figure 3:
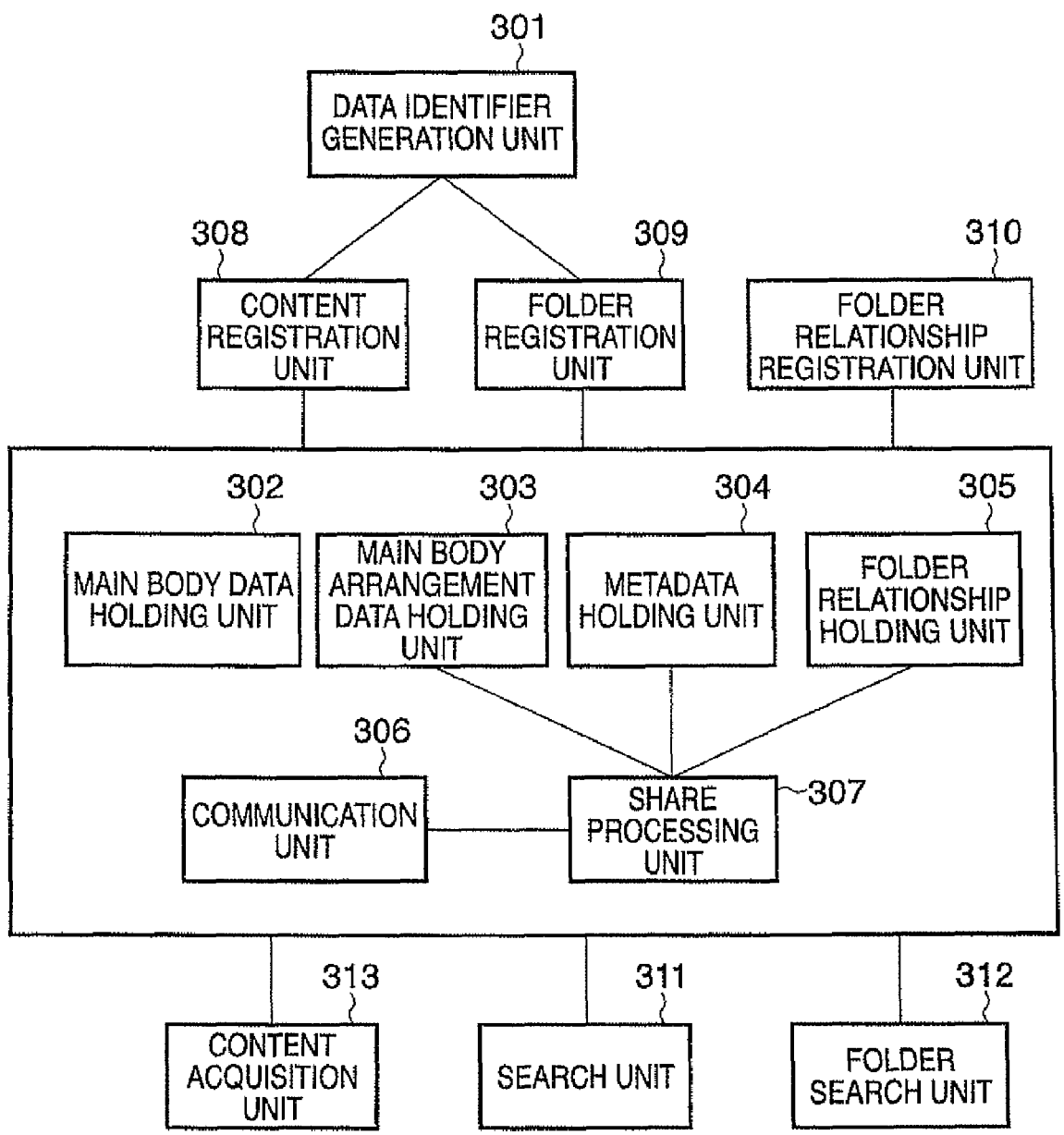
FIG. 3 is a block diagram showing the functional arrangement of a distributed data management module 104.

FIG. 3 is a block diagram showing the functional arrangement of the distributed data management module 104. The distributed data management modules 104 and 114 are installed in different computers but basically have the same arrangement, as described above. The explanation made with reference to FIG. 3 also applies to the distributed data management module 114.

Referring to FIG. 3, a data identifier generation unit 301 generates unique information (data identifier) and assigns it to each folder or file in the system of this embodiment.

When the computer 101 connects to the network 121 for the first time, the computer 101 registers itself in the network 121. At this time, a module ID is assigned to the distributed data management module 104 of the computer 101. The module ID is a unique ID in the system of this embodiment and contains data with a fixed length.

The data identifier generation unit 301 generates a data identifier to be assigned to a target by combining the module ID with serial number information indicating the generation order of the data identifier assignment target (folder or file). The number indicated by the serial number information also has a fixed length. Hence, the data identifier also has a fixed length.

For example, assume that the module ID of the distributed data management module 104 is 001, and a data identifier should be generated for a folder (or file) that is generated as the 203rd folder (or file) in the computer 101. If the number represented by serial number information has a fixed length of five digits, the data identifier is 00100203.

The method of causing the data identifier generation unit 301 to generate a data identifier is not limited to that described above, and various modifications are available. For example, a data identifier may be generated by using the network address of the computer or an expected data identifier generation date/time. Alternatively, a data identifier may be generated by combining serial numbers in the same time zone.

Referring back to FIG. 3, a main body data holding unit 302 holds the files of various contents by using the file system 102. Examples of the contents are JPEG data and MPEG data. The main body data holding unit 302 manages a file by using a data identifier generated for the file by the data identifier generation unit 301. That is, the main body data holding unit 302 holds a file having a data identifier as a file name under a predetermined folder (e.g., /data) of the file system 102. For example, a file having a data identifier "00100203" is saved as "/data/00100203" on the file system 102. On the other hand, to acquire a file managed by the main body data holding unit 302, the file is read out from the file system 102 by using the file name (i.e., data identifier) of the file.

To prevent any increase in the number of files under the folder, the data identifier may be divided. A subfolder is created by using one part of the divided identifiers as the folder name, and a file is created by using the remainder of the divided identifiers. When the identifier of the above-described example is divided into two parts each containing four numbers, the file is saved as "/data/0010/0203". Alternatively, one file on the file system 102 may hold a plurality of file data together. In this case, data representing the position of each file data is separately held on the file.

For example, two data, i.e., data with a data identifier "00100031" (size: 14,000 bytes) and data with a data identifier "00100032" (size: 16,000 bytes) are saved in one file. The contents of the two files are as follows.

☐☐☐☐• File having a plurality of entities (file name: /data/0010)
    Bytes 1 to 14000: entity data of data identifier "00100031"
    Bytes 14001 to 14336: padding (all data are 0x00)
    Bytes 14337 to 30336: entity data of data identifier "00100032"
    Bytes 30337 to 30720: padding (all data are 0x00)
File holding position data (file name: /index/0010)
    Identifier=00100031, starting point=1, length=14000
    Identifier=00100032, starting point=14337, length=16000
    To add data, the entity is added to the entity file corresponding to the four numbers of the first half of the data identifier, and position information is added to the position data file.

Anyway, the method of saving and acquiring a file on the basis of a data identifier by using the file system 102 is not particularly limited.

A main body arrangement data holding unit 303 holds table information representing which distributed data management module manages (which computer holds) a file. The table information is held and searched by using the RDBMS 103. FIG. 6 is a view showing a configuration example of the table information held by the main body arrangement data holding unit 303.

Referring to FIG. 6, an area 601 registers the data identifier of each managed file. An area 602 registers the module ID of each distributed data management module that manages the files in correspondence with a file. For example, a file with a data identifier "00100238" is managed by the distributed data management module 104 with a module ID "001". A data identifier and the module ID of a distributed data management module that manages a file having the data identifier are registered in the table information shown in FIG. 6 by using the RDBMS 103. In this way, the data identifiers and module IDs are managed in correspondence. Search using a data identifier as a key in the area 601 allows to obtain the module ID of the distributed data management module that manages the file having the data identifier.

Referring back to FIG. 3, a metadata holding unit 304 holds the metadata of folders or files managed by the distributed data management module 104. Examples of metadata are a file name (folder name) and a date/time of creation. An image data file may contain its thumbnail as metadata. The metadata are held and searched for by using the RDBMS 103. FIG. 7 is a view showing a configuration example of metadata held by the metadata holding unit 304. In the example shown in FIG. 7, file names (folder names) and creation dates/times are used as metadata.

Referring to FIG. 7, an area 701 registers the data identifier of a managed file or folder. An area 702 stores data indicating that the corresponding data identifier is of a folder or file. In FIG. 7, "F" indicates a folder, and "C" indicates a file. For example, data with a data identifier "00100185" is a folder, and data with a data identifier "00100203" is a file, as can be seen from the table in FIG. 7.

An area 703 registers the name (file name or folder name) of a corresponding file or folder. An area 704 registers the creation date/time of a corresponding file or folder.

In this way, the data identifiers and metadata are managed in association with each other (as sets). Search using a data identifier as a key in the area 701 allows to obtain the metadata of the file or folder having the data identifier.

The type of information contained in the metadata is not particularly limited. The type of information contained in the metadata may change between folders and files. In this case, the metadata of folders and that of files are registered in different tables.

Referring back to FIG. 3, a folder relationship holding unit 305 holds relationship information (folder relationship data) that indicates the relationship between managed files and folders. The folder relationship data indicates the relationship between a file and a folder that holds the file or the relationship between a folder and a subfolder. For example, holding a file in a folder is equivalent to defining the folder as a parent and the file as a child. For example, holding a subfolder in a folder is equivalent to defining the folder as a parent and the subfolder as a child. The folder relationship data is held and searched by using the RDBMS 103. FIG. 8 is a view showing a configuration example of folder relationship data.

Referring to FIG. 8, an area 801 registers the data identifier of a folder serving as a parent. An area 802 registers the data identifier of a subfolder or file serving as a child. In the example shown in FIG. 8, the parent of a file or folder with a data identifier "00100203" is a folder with a data identifier "00100185". The parent of a file or folder with a data identifier "00100238" is a folder with a data identifier "00100185". That is, the folder having the data identifier "00100185" stores, as children, the file or folder with the data identifier "00100203" and the file or folder with the data identifier "00100238", as is known.

Even when the files and folders are organized hierarchically, the folder relationship holding unit 305 manages only the relationship between a parent and its children.

To acquire a file or folder (to be referred to as an "element") belonging to a given folder (key folder), a search process is executed by using the data identifier of the key folder as a key in the area 801. With this search, the data identifiers of children corresponding to the data identifier of the key folder are obtained from the area 802. The folders and files corresponding to the data identifiers of the found children are acquired. To acquire the parent folder of a given element, a search process is executed by using the data identifier of the element as a key in the area 802. With this search, the data identifiers of parent folder of the element is obtained from the area 801. The folder (parent folder) corresponding to the found data identifier is acquired.

Referring back to FIG. 3, a communication unit 306 executes data communication with the distributed data management module of another computer via the network interface 206.

A share processing unit 307 executes a process of causing the distributed data management module of another computer to share the data (shared data) held by the main body arrangement data holding unit 303, metadata holding unit 304, and folder relationship holding unit 305.

The distributed data management modules of computers hold identical shared data by identical arrangements. That is, the computers share identical shared data. When addition, deletion, or change has been done for shared data managed by the distributed data management module of a computer (change source), i.e., when shared data managed by the distributed data management module of the change source is different from that managed by the distributed data management modules of the remaining computers, the share processing unit 307 of the change source notifies the remaining computers of the change. This allows to reflect the change on the shared data managed by the distributed data management modules of the remaining computers. Upon receiving the notification, the share processing unit 307 of each computer reflects the change on the shared data managed by itself. Hence, all computers manage the same shared data.

For example, if a computer with a module ID "001" deletes shared data (=file or content) with a data identifier "00100203", information held by the metadata holding unit, folder relationship holding unit, and main body arrangement data holding unit of computers except the computer with the module ID "001" also reflects the deletion of the shared data with the data identifier "00100203".

An offline computer can reflect the change on its managed shared data after changing to an online mode.

A content registration unit 308 adds, changes, or deletes a file (content) in response to a request from the application 105.

To add a file when file addition is instructed via the keyboard 207 or mouse 208), the application 105 supplies the data of the file and the metadata of the file to the content registration unit 308. Some metadata may be generated at this time or by analyzing the file. Upon receiving the file addition request from the application 105, the content registration unit 308 generates the data identifier of the file to be added by using the data identifier generation unit 301.

To change an existing file (when file change is instructed via the keyboard 207 or mouse 208), the application 105 supplies the changed file or metadata to the content registration unit 308 together with the data identifier of the changed file.

To delete an existing file (when file deletion is instructed via the keyboard 207 or mouse 208), the application 105 supplies the data identifier of the deletion target file to the content registration unit 308.

As described above, the content registration unit 308 adds, changes, or deletes data held by the main body data holding unit 302, main body arrangement data holding unit 303, and metadata holding unit 304 in response to a request. The process of the content registration unit 308 will be described later in detail with reference to FIG. 10.

A folder registration unit 309 adds, changes, or deletes a folder in response to a request from the application 105.

To add a folder (when folder addition is instructed via the keyboard 207 or mouse 208), the application 105 supplies the metadata of the folder to the folder registration unit 309. Some metadata may be generated at this time or by analyzing the folder. Upon receiving the folder addition request from the application 105, the folder registration unit 309 generates the data identifier of the folder to be added by using the data identifier generation unit 301.

To change an existing folder (when folder change is instructed via the keyboard 207 or mouse 208), the application 105 supplies the metadata of the change target folder to the folder registration unit 309.

To delete an existing folder (when folder deletion is instructed via the keyboard 207 or mouse 208), the application 105 supplies the data identifier of the deletion target folder to the folder registration unit 309.

As described above, the folder registration unit 309 adds, changes, or deletes a folder held by the metadata holding unit 304 in response to a request. The process of the folder registration unit 309 will be described later.

The process executed by the folder registration unit 309 includes addition, change, and deletion of folders themselves and not subfolder registration or file registration in a folder. They are included in a folder-related process to be described next.

A folder relationship registration unit 310 executes addition registration and deletion registration related to folders in response to a request from the application 105. To allocate a file or subfolder to a folder, folder relationship addition registration is executed. To cancel allocation of a file or subfolder to a folder, folder relationship deletion registration is executed.

The folder relationship registration process is implemented by adding, to the folder relationship holding unit 305, a record including a set of the data identifier of a parent folder as an allocation destination and the data identifier of an element (a file or subfolder belonging to the parent folder) to be allocated to the parent folder.

The folder relationship deletion process is implemented by deleting, from the folder relationship holding unit 305, a record including a set of the data identifier of an element to be deleted and the data identifier of a parent folder to which the element belongs.

Since the folder relationship registration process is independent from the above-described file registration process and folder registration process, a file or folder does not always have a parent folder. In this embodiment, a folder can have only one parent folder. A file can have a plurality of parent folders. However, the system may allow a folder to have a plurality of parent folders or a file to have only one parent folder.

A search unit 311 searches for a file or folder by using metadata held by the metadata holding unit 304 in response to a request from the application 105. This search process is implemented by searching each area of the table in FIG. 7 held by the metadata holding unit 304 and acquiring a record matching a condition by using the search function of the RDBMS 103. A data identifier as the value in the area 701 of the acquired record is returned as a search result list. For example, the data identifier of data with a name including a specific character string or the data identifier of data with a creation date/time within a designated range can be acquired. Search can also be done on the basis of a logical combination of conditions in a plurality of areas.

For example, in the above-described search process, the search target can be narrowed down to a file or folder. Instead of returning a data identifier list as a search result, a result list including a set of specific areas of metadata as elements may be returned. The result list may be sorted by using the specific areas as a key.

A folder search unit 312 searches for a folder or file serving as a folder element or parent folder on the basis of the folder relationship by using the data held by the metadata holding unit 304 and the folder relationship data held by the input/output interface 205 in response to a request from the application 105. The folder search process will be described later in detail.

If the folder configuration is deep, folder search is repeated to trace the folder relationship from a folder as the source of search so that a child folder or file can be found and acquired. Note that there are also folders and files having no folder relationship with the folder as the source of search. These folders and files can be searched for by using the above-described search unit 311.

A content acquisition unit 313 acquires files held by the main body data holding unit 302 and metadata held by the metadata holding unit 304. To acquire a folder, the content acquisition unit 313 refers to the main body arrangement data held by the main body arrangement data holding unit 303. If the folder is managed by the distributed data management module of another computer, the content acquisition unit 313 acquires the folder from the distributed data management module by using the communication unit 306. The content acquisition process will be described later in detail.

Figure 10:
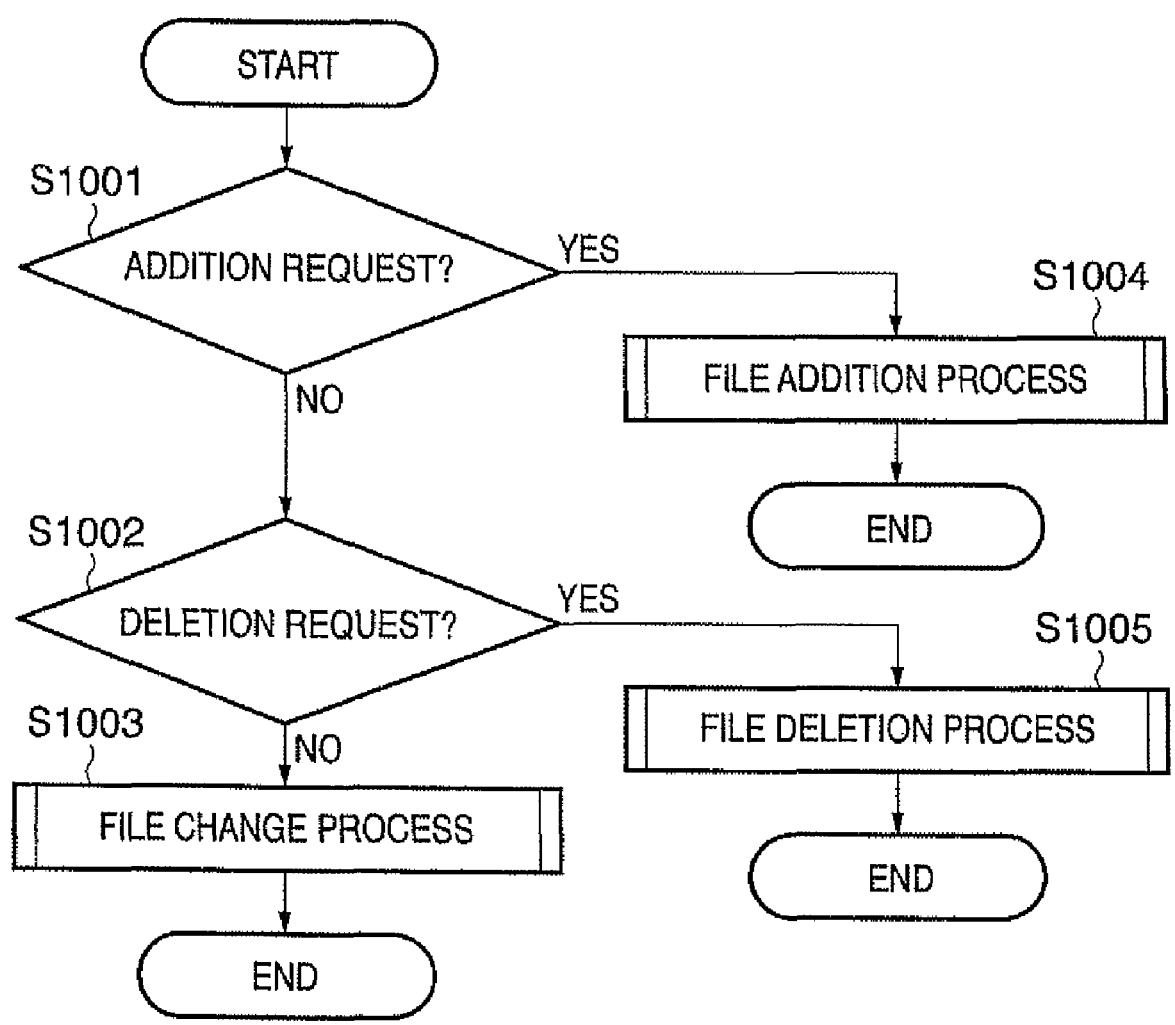
FIG. 10 is a flowchart of a process of handling a file.

A detailed process of the computer 101 will be described next. FIG. 10 is a flowchart of a process of handling a file. The hard disk drive 204 stores the program and data to cause the CPU 201 to execute the process shown in FIG. 10 and process target data, which are loaded to the RAM 203 as needed under the control of the CPU 201. The computer 101 executes the process to be described below by causing the CPU 201 to execute the process by using the loaded program and data.

The process according to the flowchart in FIG. 10 starts when the application 105 transmits a file registration request to the distributed data management module 104. The process also starts when the distributed data management module (distributed data management module 114 in FIG. 1) of another computer transmits a file registration request to the distributed data management module 104.

In step S1001, it is checked whether, the request the distributed data management module 104 has received from the application 105 is a file addition request. In this check process, registration request type data in the header of the received request is referred to. If the communication form employs remote method invocation, the check process can be done by changing the invoked method. A technique of invoking a program in another apparatus as if it were a method in the same program, like a Web service or CORBA, is called remote method invocation. That is, the check method is not particularly limited.

If it is determined by check in step S1001 that the request is a file addition request, the process advances to step S1004 to execute a file addition process. The process in step S1004 will be described later in detail.

On the other hand, if the request the distributed data management module 104 has received from the application 105 is not a file addition request, the process advances to step S1002 to check whether the request is a file deletion request. This check process is done as in step S1001. If it is determined by check in step S1002 that the request is a file deletion request, the process advances to step S1005 to execute a file deletion process. The process in step S1005 will be described later in detail.

On the other hand, if the request the distributed data management module 104 has received from the application 105 is not a file deletion request, the process advances to step S1003. In step S1003, a file change process is executed. The process in step S1003 will be described later in detail with reference to FIGS. 11 to 13.

Figure 11:
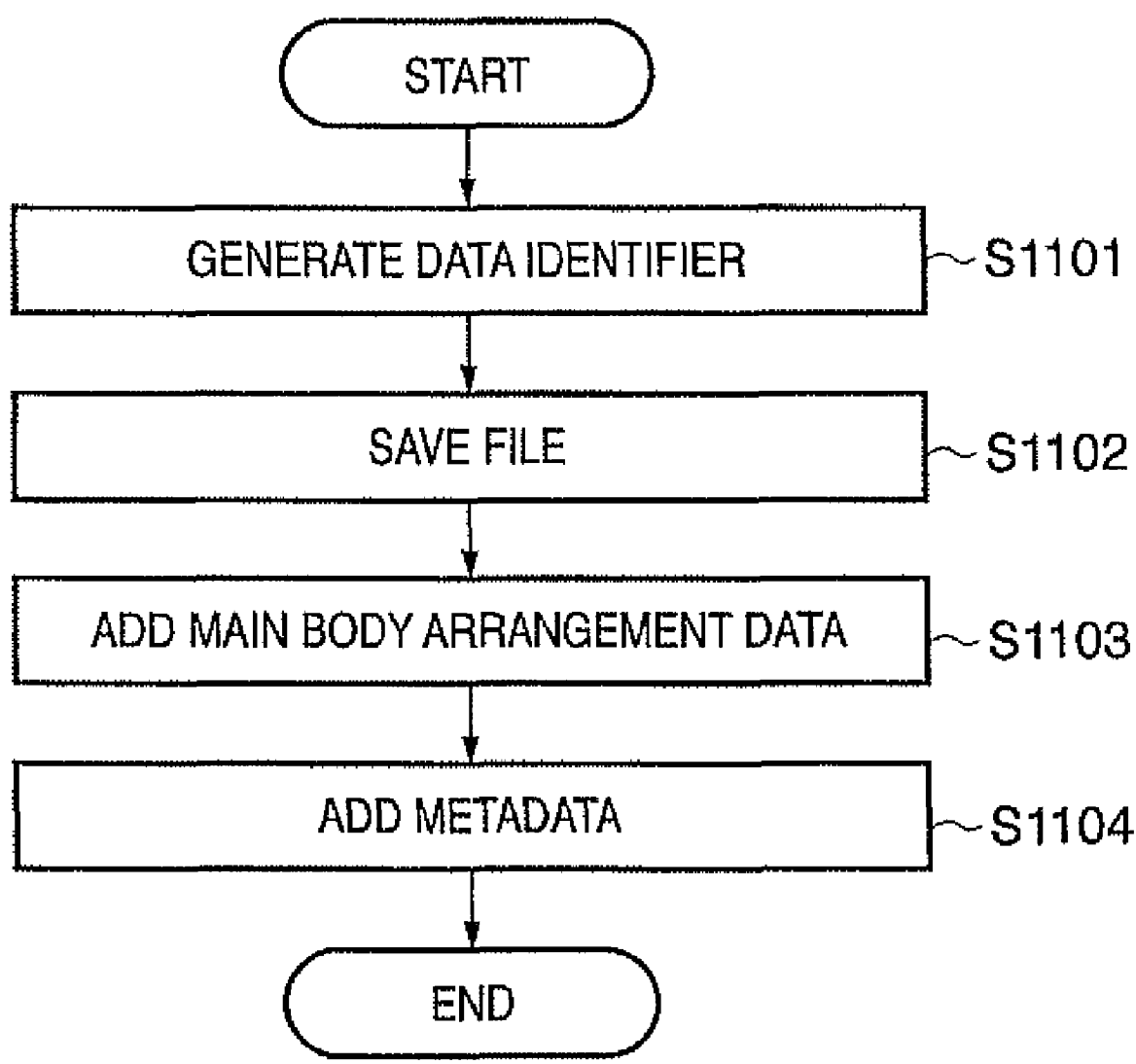
FIG. 11 is a flowchart showing details of a file addition process in step S1004.

FIG. 11 is a flowchart showing details of the file addition process in step S1004.

In step S1101, a data identifier for a file to be added is generated by using the data identifier generation unit 301. In step S1102, the file to be added is registered in the main body data holding unit 302 by using the data identifier generated in step S1101 as a key. In this registration, for example, the registration target file is registered as a file having the data identifier generated in step S1101 as the file name, as described above.

In step S1103, a set of the data identifier generated in step S1101 and the module ID of the distributed data management module 104 is registered in the table shown in FIG. 6. More specifically, the data identifier is registered in the area 601 while the module ID is registered in the area 602.

In step S1104, the data identifier generated in step S1101 is registered in the area 701 of the table shown in FIG. 7. "C" indicating that the registration target is a file is registered in the area 702. The file name of the registration target file is registered in the area 703. The creation date/time of the registration target file is registered in the area 704. As described above, metadata contains various kinds of information.

Figure 12:
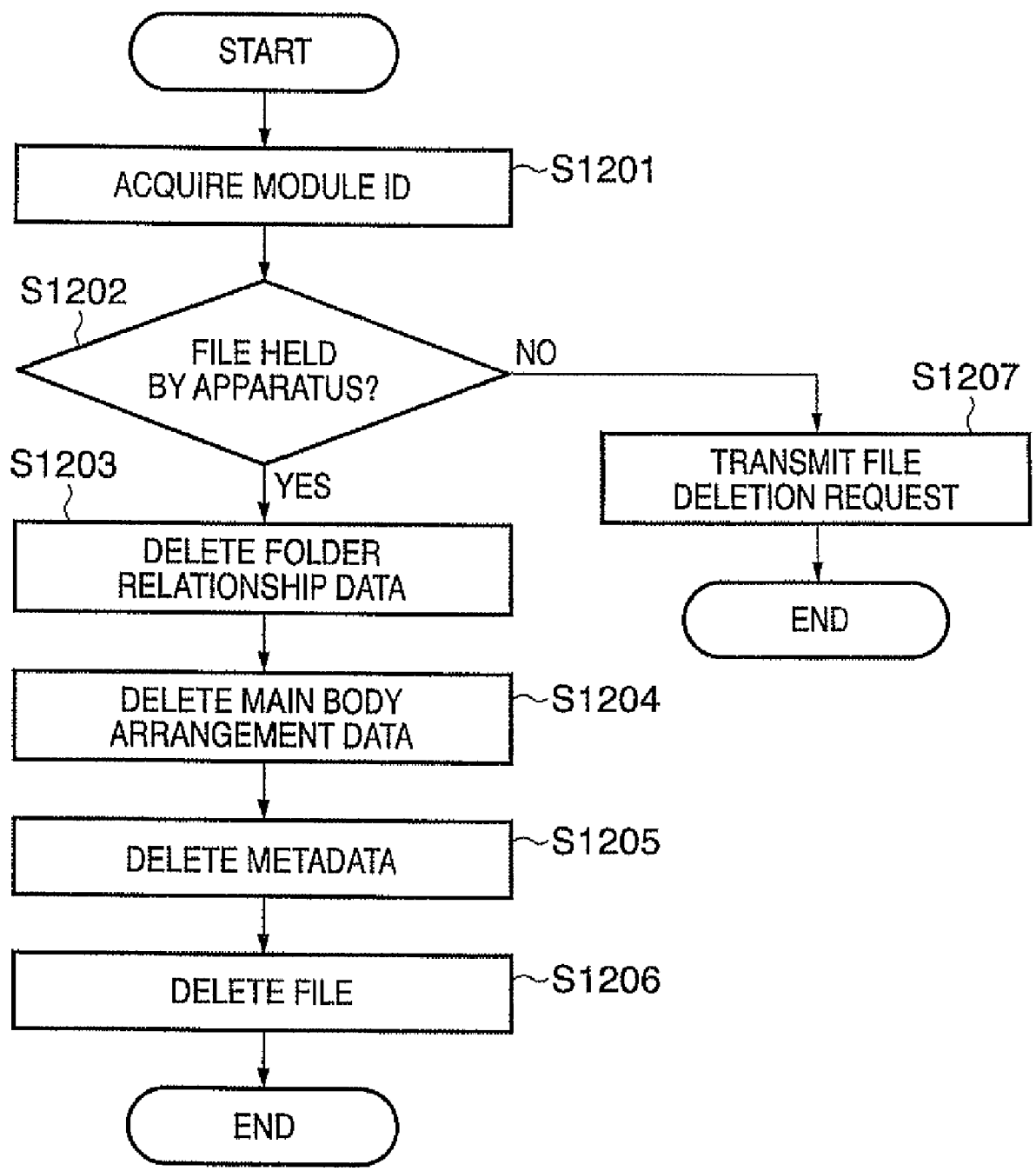
FIG. 12 is a flowchart showing details of a file deletion process in step S1005.

FIG. 12 is a flowchart showing details of the file deletion process in step S1005.

In step S1201, upon receiving the data identifier of a file designated as a deletion target from the application 105, a module ID corresponding to the received data identifier is acquired from the table in FIG. 6 held by the main body arrangement data holding unit 303.

In step S1202, the module ID acquired in step S1201 is compared with the module ID of the distributed data management module 104 to check whether they match. That is, the process in step S1202 checks whether the distributed data management module 104 manages the file designated as the deletion file from the application 105.

If the result of the check process indicates a mismatch, the process advances to step S1207. In step S1207, together with the data identifier of the file designated as the deletion target from the application 105, a file deletion instruction is transferred to another distributed data management module (the distributed data management module of a computer that actually manages the file) specified by the module ID acquired in step S1201. Information in the folder relationship holding unit, main body arrangement data holding unit, metadata holding unit, and main body data holding unit is updated.

If the result of the check process in step S1202 indicates a match, the process advances to step S1203. In step S1203, the area 802 where the data identifier of the file designated as the deletion target from the application 105 is registered and the data identifier registered in the area 801 in correspondence with the data identifier are deleted from the table shown in FIG. 8 held by the folder relationship holding unit 305. For example, assume that the data identifier of the file designated as the deletion target from the application 105 is "00200745", and the distributed data management module 104 manages this file. In this case, the data identifiers "00200745" and "00100331" are deleted from the table in FIG. 8. This is equivalent to deleting the file having the data identifier "00200745" (i.e., the file as the target of the deletion instruction) from the parent folder with the data identifier "00100331".

In step S1204, the area 601 where the data identifier of the file designated as the deletion target from the application 105 is registered and the module ID registered in the area 602 in correspondence with the data identifier are deleted from the table shown in FIG. 6 held by the main body arrangement data holding unit 303.

In step S1205, the area 701 where the data identifier of the file designated as the deletion target from the application 105 is registered and data registered in the areas 702, 703, and 704 in correspondence with the data identifier are deleted from the table shown in FIG. 7 held by the metadata holding unit 304.

In step S1206, a file having, as the file name, the data identifier of the file designated as the deletion target from the application 105, is deleted from the main body data holding unit 302.

Figure 13:
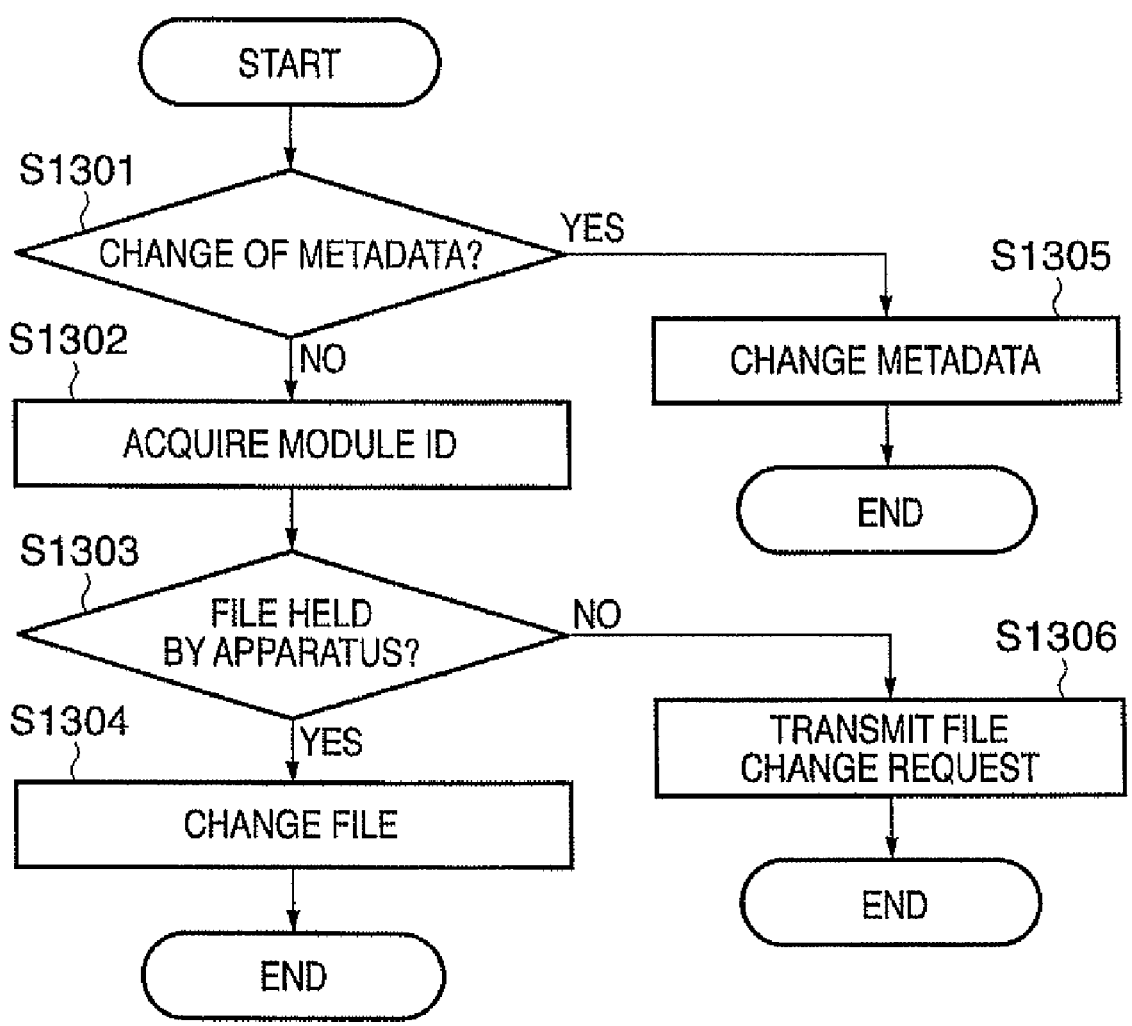
FIG. 13 is a flowchart showing details of a file change process in step S1003.

FIG. 13 is a flowchart showing details of the file change process in step S1003.

In step S1301, it is checked whether the request received from the application 105. This check process is done as in step S1001.

If the result of the check process indicates that the request received from the application 105 is a metadata change request, the process advances to step S1305. To execute the process according to the flowchart in FIG. 13, the data identifier of the change target file or the data identifier of a file to which the change target metadata is added is obtained from the application 105. In step S1305, of the data associated with the data identifier in the table shown in FIG. 7 held by the metadata holding unit 304, data as the target of the change instruction is changed in accordance with the change instruction.

If the result of the check process in step S1301 indicates that the request received from the application 105 is not a metadata change request, the process advances to step S1302.

In step S1302, a module ID corresponding to the data identifier received from the application 105 is acquired from the table shown in FIG. 6 held by the main body arrangement data holding unit 303.

In step S1303, the module ID acquired in step S1302 is compared with the module ID of the distributed data management module 104 to check whether they match. That is, the process in step S1303 checks whether the distributed data management module 104 manages the file as the target of the change request from the application 105.

If the result of the check process indicates a mismatch, the process advances to step S1306. In step S1306, together with the data identifier of the file as the target of the change request from the application 105, a file change instruction is transferred to another distributed data management module specified by the module ID acquired in step S1302.

If the result of the check process in step S1303 indicates a match, the process advances to step S1304. In step S1304, a change process corresponding to the change request is executed for, of files held by the main body data holding unit 302, a file having the data identifier received from the application 105 as the file name.

Addition, deletion, and change of a folder will be described next. The process to be executed, i.e., addition, deletion, or change of a folder is also instructed from the application 105, and the distributed data management module 104 determines the instruction type, like a file. The determination process of the distributed data management module 104 is basically the same as in the flowchart in FIG. 10. The process to be executed by the distributed data management module 104 upon receiving a folder addition request from the application 105 and the process to be executed by the distributed data management module 104 upon receiving a deletion request will be described below. Upon receiving a folder change request from the application 105, the distributed data management module 104 only changes metadata corresponding to a folder, and a description thereof will be omitted.

Figure 14:
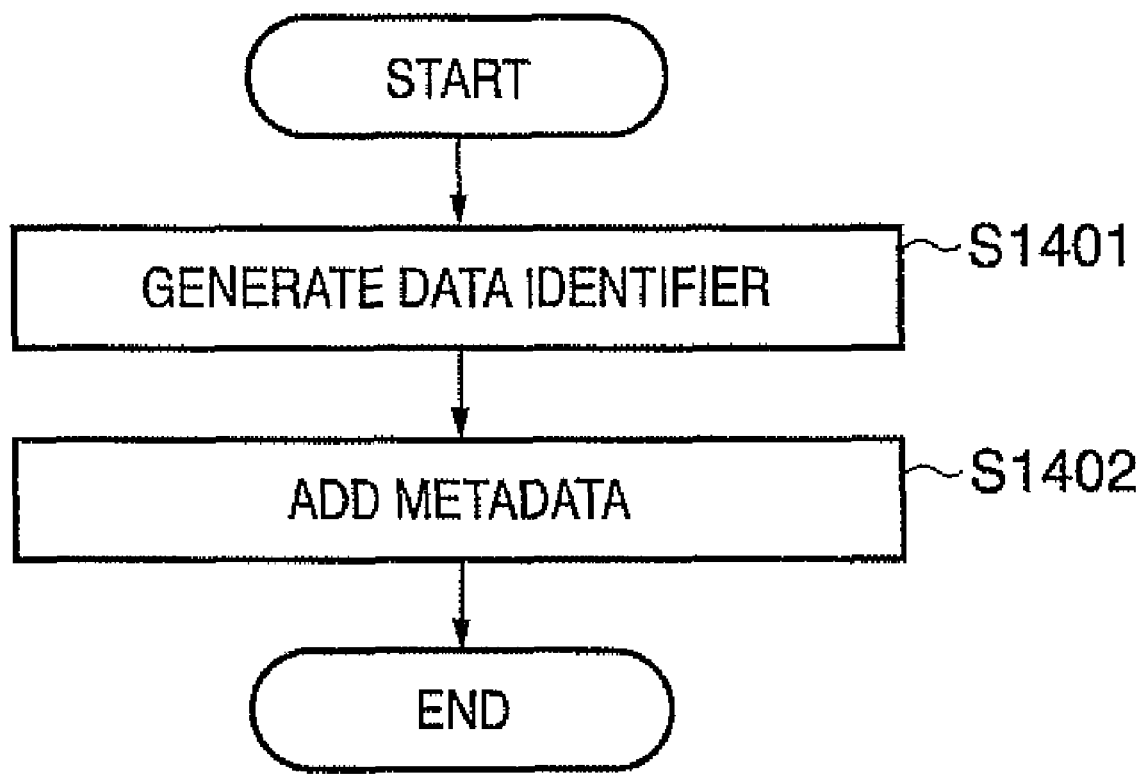
FIG. 14 is a flowchart of a folder addition process by the distributed data management module 104.

FIG. 14 is a flowchart of a folder addition process by the distributed data management module 104. The process according to the flowchart in FIG. 14 starts when the application 105 transmits a folder addition request to the distributed data management module 104.

In step S1401, a data identifier for a folder to be added is generated by using the data identifier generation unit 301. In step S1402, in the table shown in FIG. 7 held by the metadata holding unit 304, the data identifier generated in step S1401 is additionally registered in the area 701. "F" is additionally registered in the area 702. The folder name of the folder as the additional registration target is additionally registered in the area 703. The creation date/time of the folder as the additional registration target is additionally registered in the area 704.

Figure 15:
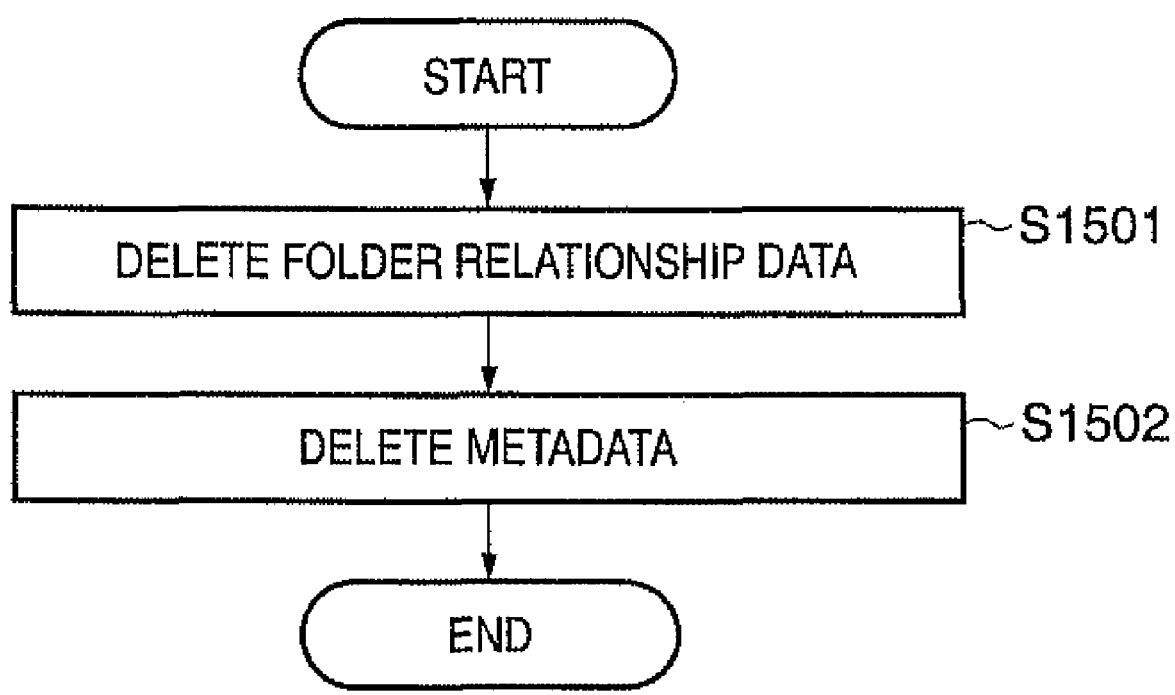
FIG. 15 is a flowchart showing details of a folder deletion process by the distributed data management module 104.

FIG. 15 is a flowchart showing details of a folder deletion process by the distributed data management module 104.

In step S1501, the area 801 where the data identifier of the folder as the target of the deletion instruction from the application 105 is registered and the area 802 corresponding to the area 801 are deleted from the table shown in FIG. 8 held by the folder relationship holding unit 305. Alternatively, only the area 802 where the data identifier of the folder as the target of the deletion instruction from the application 105 is registered is deleted.

With this process, the folder relationship between the folder as the deletion instruction target and its parent folder, child folders, and files as folder elements is deleted. The child folders of the folder and the files as folder elements lose their parent folder by this deletion. In this embodiment, however, no problem is posed because the parent folder need not always exist.

In step S1502, the area 701 where the data identifier of the folder as the deletion instruction target is registered and the areas 702 to 704 where metadata corresponding to the data identifier are registered are deleted from the table shown in FIG. 7 held by the metadata holding unit 304.

Figure 16:
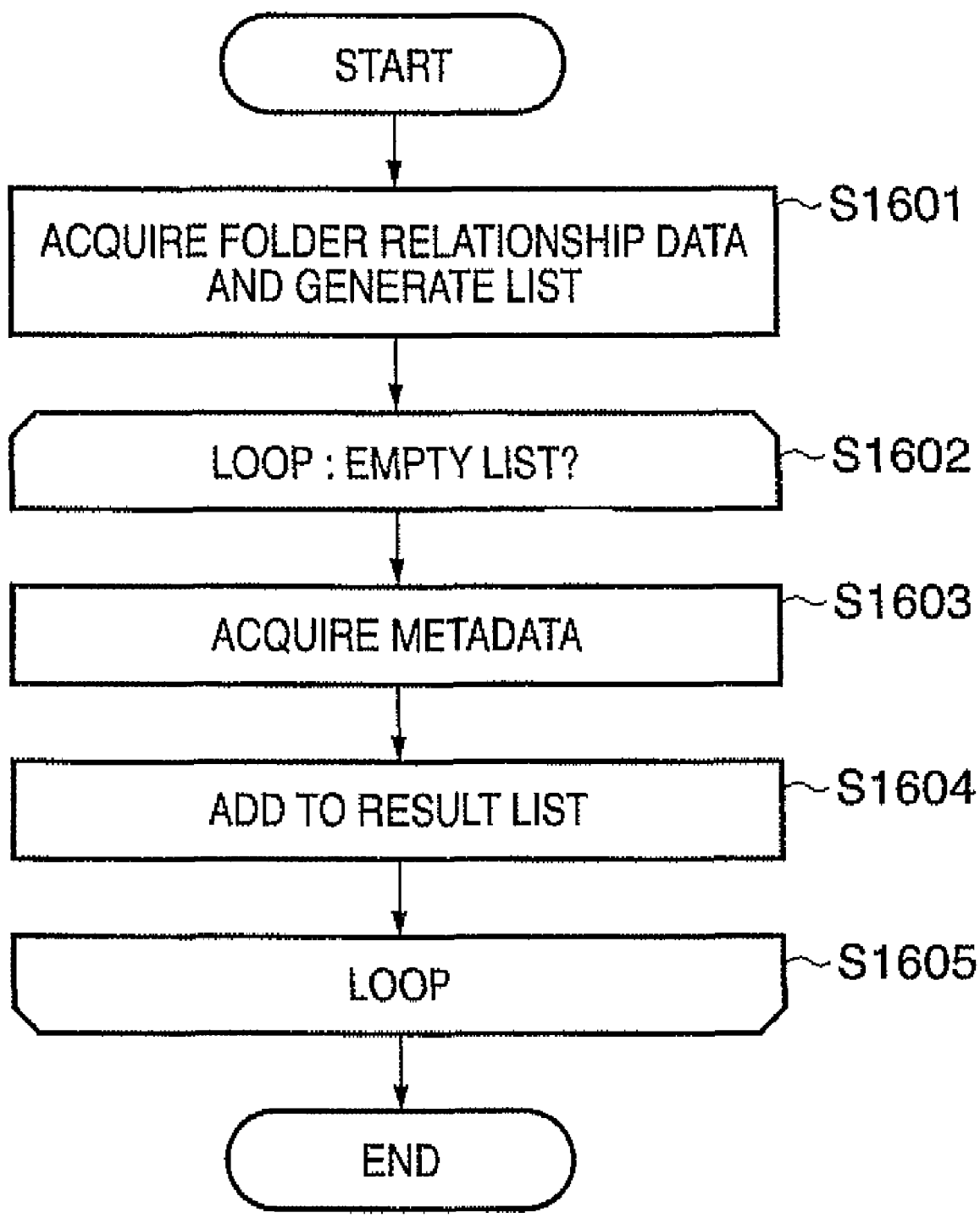
FIG. 16 is a flowchart of a folder search process.

FIG. 16 is a flowchart of a folder search process. The folder search process starts when the application 105 transmits a folder search request to the distributed data management module 104.

In step S1601, the area 801 where the data identifier of the source folder designated by the folder search request is specified in the table shown in FIG. 8 held by the folder relationship holding unit 305. A data identifier registered in the corresponding area 802 is acquired and registered in a list. This list is blank in the initial state. Every time the area 801 where the data identifier of the source folder designated by the folder search request is specified, the data identifier registered in the corresponding area 802 is registered.

The process in steps S1603 and S1604 is executed until the generated list becomes empty.

In step S1603, a data identifier registered in the list is read out and deleted from the list. By looking up the table shown in FIG. 7, the area 701 where the readout data identifier is registered is searched for, and metadata corresponding to the found area 701 is acquired. For example, if the readout data identifier is "00100203", metadata {"C", "○○◇◇", and "2005.2.15 16:32"} is acquired.

In step S1604, of the acquired metadata, data registered in the areas 703 and 704 are registered in the result list. For example, if the readout data identifier is "00100203", "○○◇◇" and "2005.2.15 16:32" are registered in the result list. This result list is blank in the initial state. Every time the process in step S1604 is executed, metadata registered in the areas 703 and 704 are registered.

The process returns from step S1605 to step S1602. If the list is empty, the process is ended. If the list is not empty, the process advances to step S1603 to read out one of the data identifiers still remaining in the list, and the subsequent process is executed.

The thus generated result list is transmitted to the request source.

Figure 17:
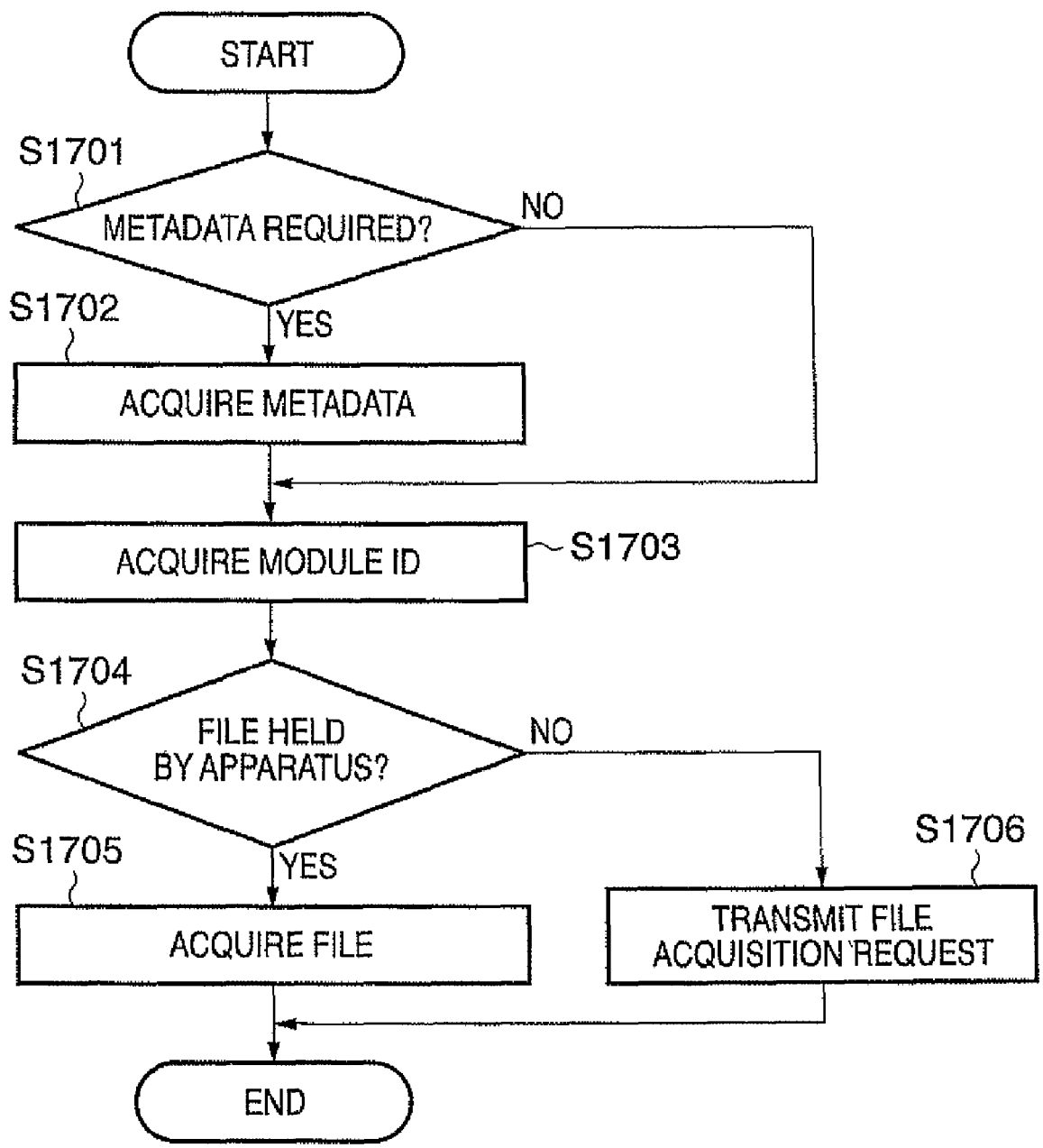
FIG. 17 is a flowchart of a file acquisition process.

FIG. 17 is a flowchart of a file acquisition process. The file acquisition process starts when the application 105 transmits a file acquisition request to the distributed data management module 104.

In step S1701, it is checked whether the file acquisition request also requests metadata. This check is done as in step S1001. If it is determined by check that no metadata is requested, the process advances to step S1703. If metadata is requested, the process advances to step S1702.

In step S1702, metadata registered in association with the data identifier designated by the file acquisition request is acquired in the table shown in FIG. 7. For example, if the data identifier is "00100203", "○○◇◇" and "2005.2.15 16:32" are acquired as metadata. The acquired metadata is sequentially additionally registered in result data. The process advances to step S1703.

In step S1703, a module ID corresponding to the data identifier designated by the file acquisition request is acquired from the table shown in FIG. 6 held by the main body arrangement data holding unit 303.

In step S1704, the module ID acquired in step S1703 is compared with the module ID of the distributed data management module 104 to check whether they match. That is, the process in step S1704 checks whether the distributed data management module 104 manages the file indicated by the data identifier designated by the file acquisition request.

If the result of the check process indicates a mismatch, the process advances to step S1706. In step S1706, together with the data identifier designated by the file acquisition request, a file acquisition instruction is transferred to another distributed data management module specified by the module ID acquired in step S1703.

If the result of the check process in step S1704 indicates a match, the process advances to step S1705. In step S1705, a file having, as the file name, the data identifier designated by the file acquisition request is acquired from the main body data holding unit 302 and additionally registered in the result data.

The thus generated result data is returned to the request source as the result of the process.

Figure 9:
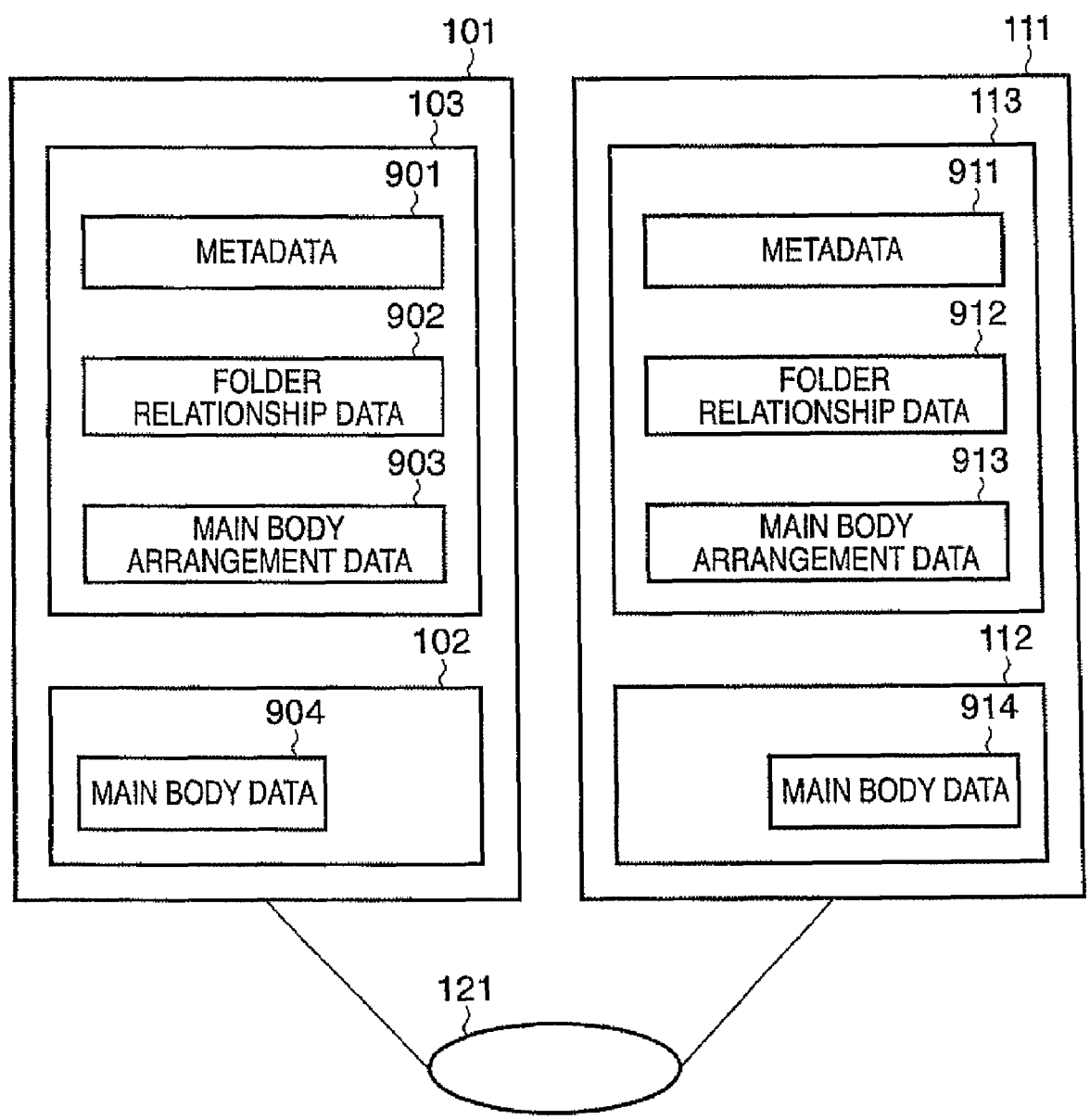
FIG. 9 is a view showing data in the computers 101 and 111.

In this embodiment, with the above-described process, metadata 901 (911), folder relationship data 902 (912), main body arrangement data 903 (913), and main body data 904 (914) are registered in the computers 101 and 111, as shown in FIG. 9. The share processing unit 307 of the distributed data management module 104 and the share processing unit 307 of the distributed data management module 114 keep the metadata 901, folder relationship data 902, and main body arrangement data 903 registered in the computer 101 and the metadata 911, folder relationship data 912, and main body arrangement data 913 registered in the computer 111 identical.

The main body data 904 and 914 need not be identical.

Since the computers hold identical metadata, folder relationship data, and main body arrangement data, the distributed data management modules of the computers manage the data logically on the basis of the same folder system. Hence, all the distributed data management modules can equally execute folder registration, content registration, folder relationship registration, folder search, search, and content acquisition. That is, each computer can operate a main body file that exists not in it but in another computer, and the result is reflected on the computers in the system.

Figure 4:
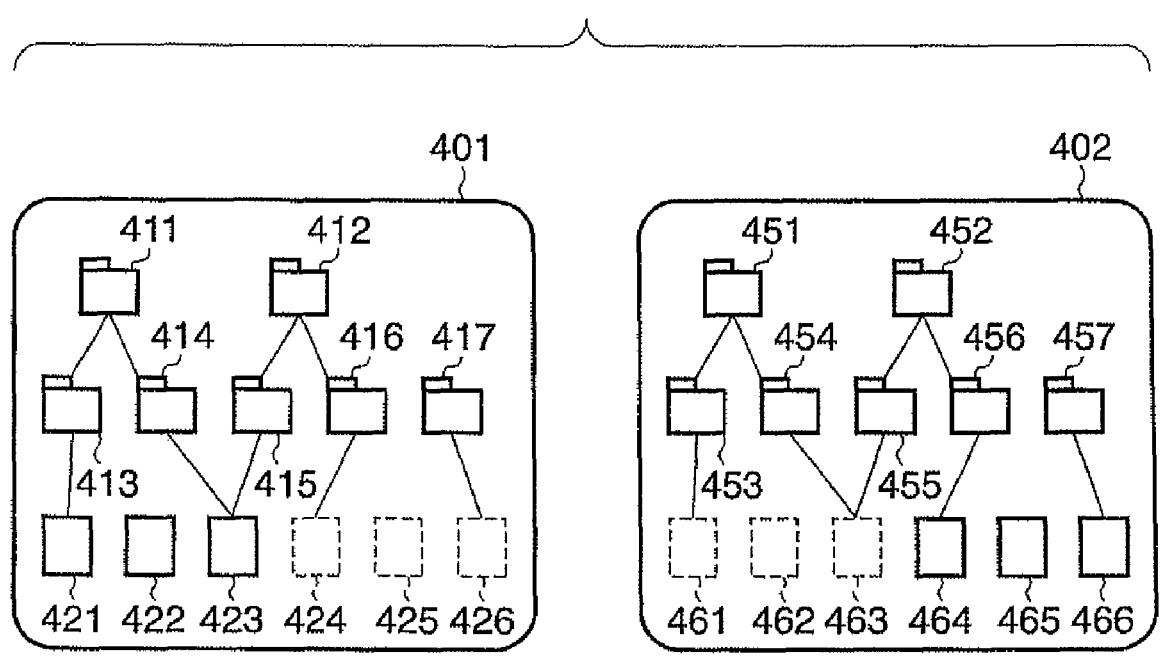
FIG. 4 is a view showing an example of the hierarchical structure of folders (files) managed by the computer.

FIG. 4 is a view showing an example of the hierarchical structure of folders (files) managed by the computer. Reference numeral 401 denotes a hierarchical structure managed by the distributed data management module 104; and 402, a hierarchical structure managed by the distributed data management module 114. Lines connecting the folders and files indicate the folder relationship.

Reference numerals 411 to 417 and 451 to 457 denote folders. As shown in FIG. 4, the distributed data management modules 104 and 114 manage the folders on the basis of the same folder structure (folder hierarchical structure). Hence, for example, the folder 411 is identical to the folder 451. The share processing unit 307 reflects a change in the folder 411 on the folder 451.

Reference numerals 421 to 426 and 461 to 466 denote files. For example, the file 421 is identical to the file 461.

Of the files 421 to 426, the files 424 to 426 are managed not by the distributed data management module 104 but by the distributed data management module 114. Similarly, of the files 461 to 466, the files 461 to 463 are managed not by the distributed data management module 114 but by the distributed data management module 104. The folders 411, 412, and 417 and files 422 and 425 have no parent folder. This also applies to the corresponding folders 451, 452, and 457 and files 462 and 465.

Even when the computers 101 and 111 are disconnected from the network 121, i.e., in the offline state, the computers have identical folder systems when the state has changed to offline. Even in the offline state, the computers can execute the same processes as those described above (the processes shown in the flowcharts) in the online state except a process using a file such as file acquisition.

However, when folder registration, content registration, and folder relationship registration are done offline, the hierarchical structure and metadata of files and folders managed by the computers change during the offline state. In this embodiment, when the computer connects to the network 121, the share processing unit 307 notifies the remaining computers of changed points. Since each computer connected to the network 121 executes this notification process, the computers can manage the files and folders on the basis of the same hierarchical structure.

As described above as a problem of the prior art, if a plurality of computers share and operate data held by a single storage device, for example, a plurality of computers may attempt to change the same file. If such a case occurs, a computer capable of preferentially operate data must be determined. To prevent conflicting processes, the process is inhibited unless files and folders related to the operation are locked. Only the distributed data management module of one of all computers included in the system can lock a folder or file. No distributed data management module in an offline state can newly acquire a lock.

Various methods are available to implement locking. In this embodiment, a distributed data management module (distributed data management module 104) serves as a lock server. That is, only the distributed data management module 104 has a lock management unit. Each distributed data management module transmits a lock acquisition request and an unlock request to the distributed data management module 104.

FIG. 18 is a view showing a configuration example of lock management data held by the lock management unit. The lock management data is managed by the RDBMS 103 in the same computer 101. The lock management data has areas 1801 and 1802. The data identifiers of folders and files held by all computers are registered in the area 1801. For, of the files and folders corresponding to the data identifiers, files and folders with an acquired lock, the module IDs of distributed data management modules that have acquired the lock are registered in the area 1802. For example, in FIG. 18, a lock for a folder (or file) with a data identifier "00100203" is acquired by a distributed data management module with a module ID "001". A lock for a folder (or file) with a data identifier "00200745" is acquired by a distributed data management module with a module ID "002". Note that no distributed data management module acquires any lock for a folder (or file) which has a data identifier ("00100238" in FIG. 18) registered in the area 1801 corresponding to the area 802 without any module ID.

Figure 19:
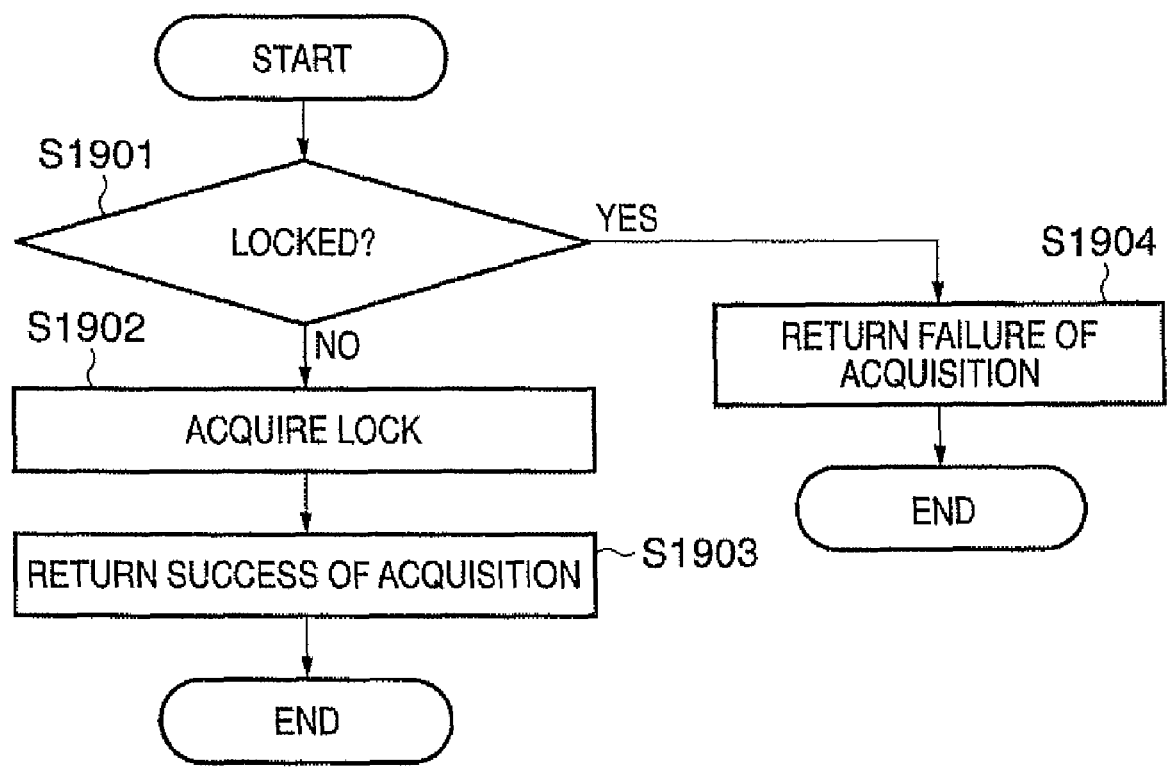
FIG. 19 is a flowchart of a process of causing the distributed data management module 104 serving as a lock server to acquire a lock.

FIG. 19 is a flowchart of a process of causing the distributed data management module 104 serving as a lock server to acquire a lock. The flowchart in FIG. 19 starts when a lock acquisition request is issued.

When a lock acquisition request is received from the distributed data management module of another computer, it is checked in step S1901 whether another computer has already acquired a lock for a file or folder designated as a lock target by the request. This check process is the same as described above.

More specifically, it is checked by referring to the management data whether no module ID is registered in the area 1802 corresponding to the data identifier of the file or folder as the lock target designated by the lock acquisition request. If the check result indicates that a module ID is registered in the corresponding area 802, it is determined that another distributed data management module has already acquired a lock. If no module ID is registered, it is determined that no other distributed data management module has acquired a lock yet.

If it is determined that a lock has already been acquired, the process advances to step S1904. In step S1904, the lock acquisition request source is notified of failure of lock.

If no lock has been acquired yet, the process advances to step S1902 to acquire a lock for the file or folder as the lock target designated by the lock acquisition request. The process in step S1902 is done by registering, in the management data shown in FIG. 18, the module ID of the distributed data management module of the lock acquisition request source in the area 1802 corresponding to the data identifier of the file or folder as the lock target designated by the lock acquisition request.

In step S1903, the lock acquisition request source is notified of success of lock acquisition.

When an unlock request is received from another distributed data management module, the area 1802 corresponding to the data identifier of a file or folder as an unlock target designated by the unlock request is made empty.

Each distributed data management module holds the data identifier of each file or folder with an acquired lock. A process such as content registration, folder registration, or folder relationship registration is executed after confirming whether a lock for a necessary file or folder has been acquired. This confirmation is done by checking whether the data identifier of a file or folder is included in the data identifiers of files and folders with an acquired lock. Various operations are allowed for only a file or folder with an acquired lock. If at least one necessary file or folder has no lock, the process is stopped.

Files and folders that require a lock in the processes are as follows.

File creation process: no
File deletion process: deletion target content
File change process: change target content
Folder creation process: no
Folder deletion process: deletion target folder
Folder change process: change target folder
Folder relationship creation process: folders which should be changed to the parent and child folders by the folder relationship or files which should be changed to folder elements
Folder relationship deletion process: no
If a computer is online, a lock necessary for a process is executed immediately before execution of it, and unlock is done immediately after execution. If a computer should operate offline, a lock for necessary files and folders is acquired before the offline state is set. Without a lock, the process for a target file or folder is not permitted in the offline state. After the computer returns to the online state, each file or folder is unlocked. The lock target file or folder is determined by the application. The application can employ a procedure of, e.g., always locking a specific folder or inquiring of the user about the target.

In this embodiment, since the computers hold identical metadata, folder relationship data, and main body arrangement data, all the distributed data management modules can equally execute folder registration, content registration, folder relationship registration, folder search, search, and content acquisition. Further, since file registration or folder registration separates from folder relationship registration, it is possible to reduce the number of files and folders that require a lock to avoid conflicting processes from different distributed data management modules.

Figure 5:
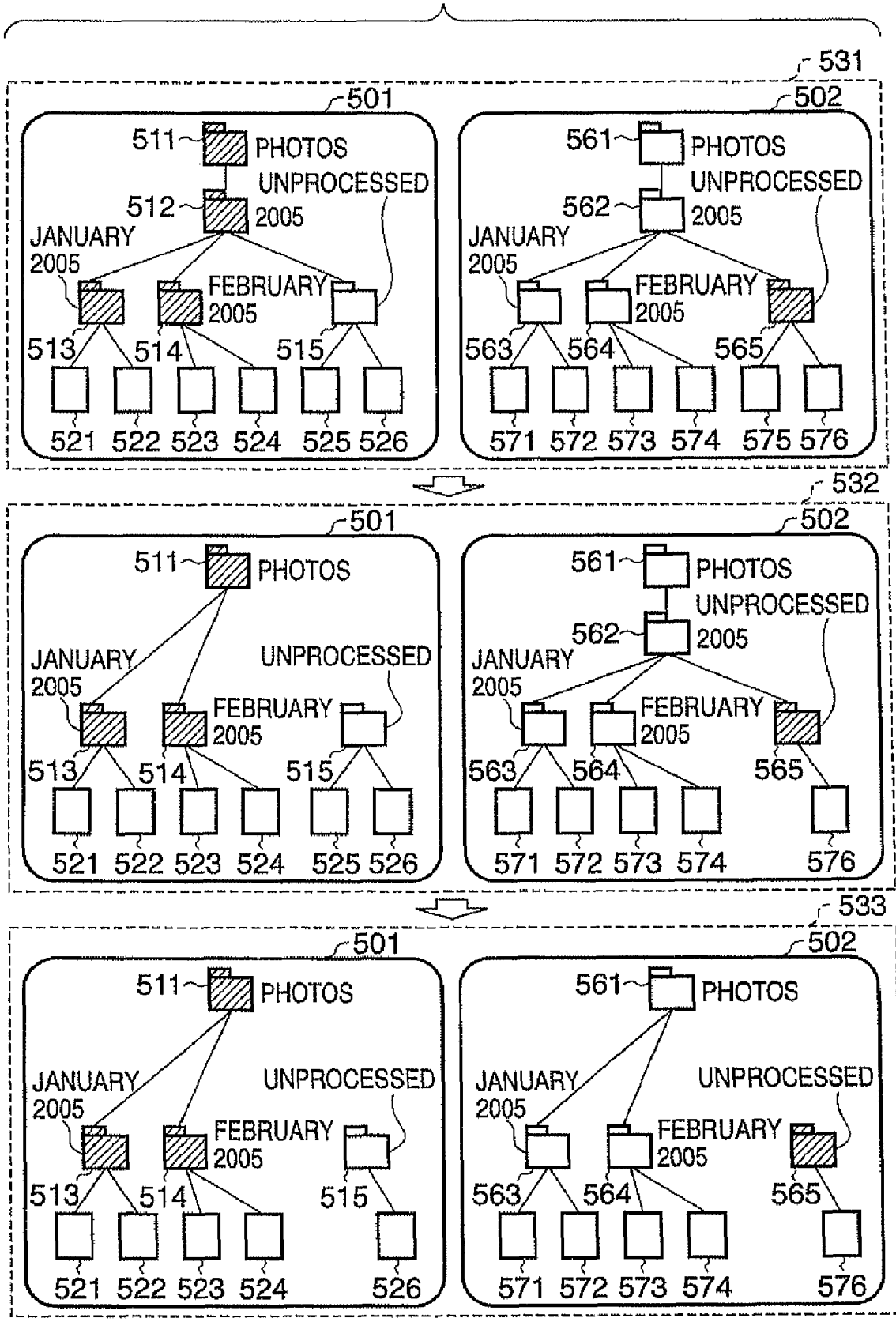
FIG. 5 is a schematic view showing an example of data change when an operation according to the first embodiment of the present invention is executed.

For example, no folders need be locked for file addition. During file addition, another computer can execute a process related to all folders. Even for folder deletion, the number of folders that require lock can be decreased. FIG. 5 is a schematic view showing an example of data change when the operation of this embodiment is executed.

Referring to FIG. 5, reference numeral 501 denotes a hierarchical structure of files and folders managed by the distributed data management module 104; and 502, a hierarchical structure of files and folders managed by the distributed data management module 114. Reference numerals 511 to 515 and 561 to 565 denote folders. As shown in FIG. 5, the distributed data management modules 104 and 114 manage the folders on the basis of the same folder structure (folder hierarchical structure). Hence, for example, the folder 511 is identical to the folder 561. The folders have their names aside.

Reference numerals 521 to 526 and 571 to 576 denote files. For example, the file 521 is identical to the file 571. Lines connecting the folders and contents indicate the folder relationship. A hatched folder is a folder with an acquired lock.

Reference numeral 531 denotes a hierarchical structure when the distributed data management modules 104 and 114 have acquired a necessary lock before they change to offline. The distributed data management module 104 should delete the folder 512 and change the folders 511, 513, and 514. Hence, a lock is acquired for the folders 511, 512, 513, and 514. The distributed data management module 114 should delete the file 575 associated with the folder 565. Hence, a lock is acquired for the folder 565.

Reference numeral 532 denotes a hierarchical structure after the distributed data management modules 104 and 114 change to offline, and each distributed data management module executes various kinds of processes. As shown in FIG. 5, the operators of the computers 101 and 111 execute arbitrary operations. For this reason, the hierarchical structure managed by the distributed data management module 104 changes from that managed by the distributed data management module 114. More specifically, in the hierarchical structure managed by the distributed data management module 104, the folder 512 is deleted, and the folders 513 and 514 are located immediately under the folder 511.

Since the distributed data management module 114 has acquired a lock for the folder 515, the distributed data management module 104 is inhibited from operating it. In the hierarchical structure managed by the distributed data management module 114, the file 575 belonging to the folder 565 is deleted. These processes can be done in parallel by acquiring locks as shown in FIG. 5.

Reference numeral 533 denotes hierarchical structures managed by the distributed data management modules 104 and 114 after they return to online, and the share processing units 307 execute the above processes. As shown in FIG. 5, since the share processing units 307 notify the partners of the contents of operations (contents of changes) executed in the computers, the distributed data management modules manage identical hierarchical structures as a result, as indicated by 533.

Since folder relationship registration separates from file registration and folder registration, a folder need not always have a parent folder. Since the folders 565 and 562 have no relationship any more, the folder 565 exists without belonging to any folder.

In a conventional distributed data management apparatus, to, e.g., delete the folder 512, all subfolders must be locked. Hence, no other computer can lock the folder 515. It is therefore impossible to parallelly delete contents belonging to the folder 515. In this embodiment, however, the two processes can be executed in parallel, as described above.

Second Embodiment

In the first embodiment, to separate file registration and folder registration from folder relationship registration, the data identifier generation unit 301 is provided. Files and folders are managed by using, as a key, a data identifier generated by the data identifier generation unit 301. However, the method of separating the processes is not limited to that described above, and various techniques are applicable. For example, a folder or file having no parent folder is managed as a folder element of a management folder prepared for management. This method allows management using a file system.

The second embodiment is different from the first embodiment in the following points. A path in a local file system is used as identification information in place of a data identifier. In file addition, a file is registered in the management folder. In file deletion, the file is deleted. In folder addition, a folder is registered in the management folder. In folder deletion, the folder is deleted. In folder relationship addition, a child folder or file is added under a parent folder in accordance with a folder relationship to be added. In folder relationship deletion, a child folder or file is moved under the management folder in accordance with a folder relationship to be deleted.

If a system includes a plurality of distributed data management modules, all of them execute the same process. Alternatively, a virtual file system may be provided to execute the above-described processes on it. In this case, data is identified on the basis of a path on the virtual file system. Actual folders and contents are held on a local file system. By holding correlation data between a path on the virtual file system and a path on the local file system, each distributed data management module can access actual data.

Third Embodiment

In the above-described embodiments, a computer that receives a file addition request holds a file. However, the present invention is not limited to this. Instead, a computer having a large free space for a file system may hold it. In addition, a plurality of computers may hold identical files. In file change or file deletion, all computers execute the same change or deletion process.

Fourth Embodiment

In the above-described embodiments, a folder relationship is only explicitly designated by an application. Alternatively, a so-called search folder having a virtual folder relationship with a file or folder that satisfies a search condition may be provided. When a search folder is added, a search condition is held as metadata. In folder search, a search unit 311 acquires a file or folder that satisfies the search condition held as metadata instead of acquiring a folder relationship. The thus acquired file or folder is returned as a folder search result as if it were a folder element having a set folder relationship.

Fifth Embodiment

In the above-described embodiments, one distributed data management module runs on one computer. However, a plurality of distributed data management modules may run as separate processes.

Other Embodiments

The object of the present invention is also achieved by the following method. A recording medium (or storage medium) which records software program codes to implement the functions of the above-described embodiments is supplied to a system or apparatus. The computer (or CPU or MPU) of the system or apparatus reads out and executes the program codes stored in the recording medium. In this case, the program codes read out from the recording medium themselves implement the functions of the above-described embodiments. The recording medium that records the program codes constitutes the present invention.

When the computer executes the readout program codes, the operating system (OS) running on the computer partially or wholly executes actual processing on the basis of the instructions of the program codes, thereby implementing the functions of the above-described embodiments.

The program codes read out from the recording medium are written in the memory of a function expansion card inserted to the computer or a function expansion unit connected to the computer. The CPU of the function expansion card or function expansion unit partially or wholly executes actual processing on the basis of the instructions of the program codes, thereby implementing the functions of the above-described embodiments.

The recording medium to which the present invention is applied stores program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-124331 filed Apr. 27, 2006 which is hereby incorporated by reference herein in its entirety.

What is claimed is:

1. A method of managing files/folders, using a computer to perform the steps of:
   a metadata holding step of holding, in a metadata holding unit, metadata for each file/folder being registered into the computer;
   an association holding step of holding, in an association holding unit, an association between a first folder and a parent folder to which the first folder belongs, wherein the association holding unit is independent of the metadata holding unit;
   a notification step of notifying another computer connected to the computer via a network of an operation result of a file or folder, being in the computer and being operated offline, at a designated timing; and
   an updating step of, responsive to notification from another computer that a second folder defined in the association as the parent folder to which the first folder belongs is deleted offline in the other computer, updating the association so that the association indicates a state, the state indicating that the first folder does not belong to any parent folder,
   wherein the first folder remains in an un-deleted state in the computer after the updating of the association.

2. A non-transitory computer-readable storage medium on which is retrievably stored computer-executable process steps for causing a computer to manage files/folders, said process steps comprising:
   a metadata holding step of holding, in a metadata holding unit, metadata for each file/folder being registered into the computer;
   an association holding step of holding, in an association holding unit, an association between a first folder and a parent folder to which the first folder belongs, wherein the association holding unit is independent of the metadata holding unit;
   a notification step of notifying another computer connected to the computer via a network of an operation result of a file or folder, being in the computer and being operated offline, at a designated timing; and
   an updating step of, responsive to notification from another computer that a second folder defined in the association as the parent folder to which the first folder belongs is deleted offline in the other computer, updating the association so that the association indicates a state, the state indicating that the first folder does not belong to any parent folder,
   wherein the first folder remains in an un-deleted state in the computer after the updating of the association.

3. An information processing apparatus comprising:
   a memory constructed to store a computer-executable program; and
   a CPU constructed to execute the computer-executable program stored in the memory,
   wherein the CPU executes the computer-executable program stored in the memory so as to control the information processing apparatus to perform a method of managing files/folders, the computer-executable program including program codes for which the CPU executes the steps that comprise:
   a metadata holding step of holding, in a metadata holding unit, metadata for each file/folder being registered into the computer;
   an association holding step of holding, in an association holding unit, an association between a first folder and a parent folder to which the first folder belongs, wherein the association holding unit is independent of the metadata holding unit;
   a notification step of notifying another computer connected to the information processing apparatus via a network of an operation result of a file or folder, being in the information processing apparatus and being operated offline, at a designated timing; and
   an updating step of, responsive to notification from another computer that a second folder defined in the association as the parent folder to which the first folder belongs is deleted offline in the other computer, updating the association so that the association indicates a state, the state indicating that the first folder does not belong to any parent folder,
   wherein the first folder remains in an un-deleted state in the information processing apparatus after the updating of the association.

* * * * *